(12) United States Patent
Ringer et al.

(10) Patent No.: US 7,799,730 B2
(45) Date of Patent: Sep. 21, 2010

(54) CATALYST SUPPORT

(75) Inventors: Norbert Ringer, Rosenheim (DE);
Gerhard Selig, Tuntenhausen (DE);
Hans-Joachim Müller, Starnberg (DE)

(73) Assignee: Sud-Chemie AG, Munich (DE)

( * ) Notice: Subject to any disclaimer, the term of this patent is extended or adjusted under 35 U.S.C. 154(b) by 296 days.

(21) Appl. No.: 11/912,308

(22) PCT Filed: Apr. 27, 2006

(86) PCT No.: PCT/EP2006/003939

§ 371 (c)(1),
(2), (4) Date: Jun. 30, 2008

(87) PCT Pub. No.: WO2006/114320

PCT Pub. Date: Nov. 2, 2006

(65) Prior Publication Data

US 2008/0277315 A1    Nov. 13, 2008

(30) Foreign Application Priority Data

Apr. 27, 2005    (DE) .................. 10 2005 019 596

(51) Int. Cl.
*C10G 35/09*    (2006.01)
(52) U.S. Cl. .................. 502/328; 502/100; 423/594.19; 423/625
(58) Field of Classification Search ......... 208/130–149; 502/100, 328; 423/594.19, 625
See application file for complete search history.

(56) References Cited

U.S. PATENT DOCUMENTS

| 4,283,307 | A | 8/1981 | Barone |
| 4,328,130 | A | 5/1982 | Kyan |
| 4,486,481 | A | 12/1984 | Heitkamp |
| 5,097,091 | A | 3/1992 | Kremer |
| 2004/0180786 | A1 | 9/2004 | Zhao |

FOREIGN PATENT DOCUMENTS

| DE | 2425058 | 12/1975 |
| GB | 1513544 | 6/1978 |
| GB | 2193907 | 2/1988 |
| GB | 2224341 | 5/1990 |
| JP | 54019487 | 2/1979 |
| SU | 526381 | 8/1976 |
| SU | 957948 | 9/1982 |
| WO | WO2004014549 | 2/2004 |

OTHER PUBLICATIONS

English translation of International Preliminary Report on Patentability pertaining to international application No. PCT/EP2006/003939, filed in the U.S. Appl. No. 11/912,308. This application may contain information material to the patentability of the current application.

*Primary Examiner*—Robert J Hill, Jr.
*Assistant Examiner*—Brian McCaig
(74) *Attorney, Agent, or Firm*—Scott R. Cox

(57) ABSTRACT

The invention relates to a cylindrical catalyst body 1 which is characterized in that indentations are provided on the circumferential surface 3 of the catalyst body 1. These indentations are preferably configured as grooves 4 and webs 5 which run parallel to the longitudinal axis 2 of the catalyst body 1.

12 Claims, 1 Drawing Sheet

CATALYST SUPPORT

Figure 1:
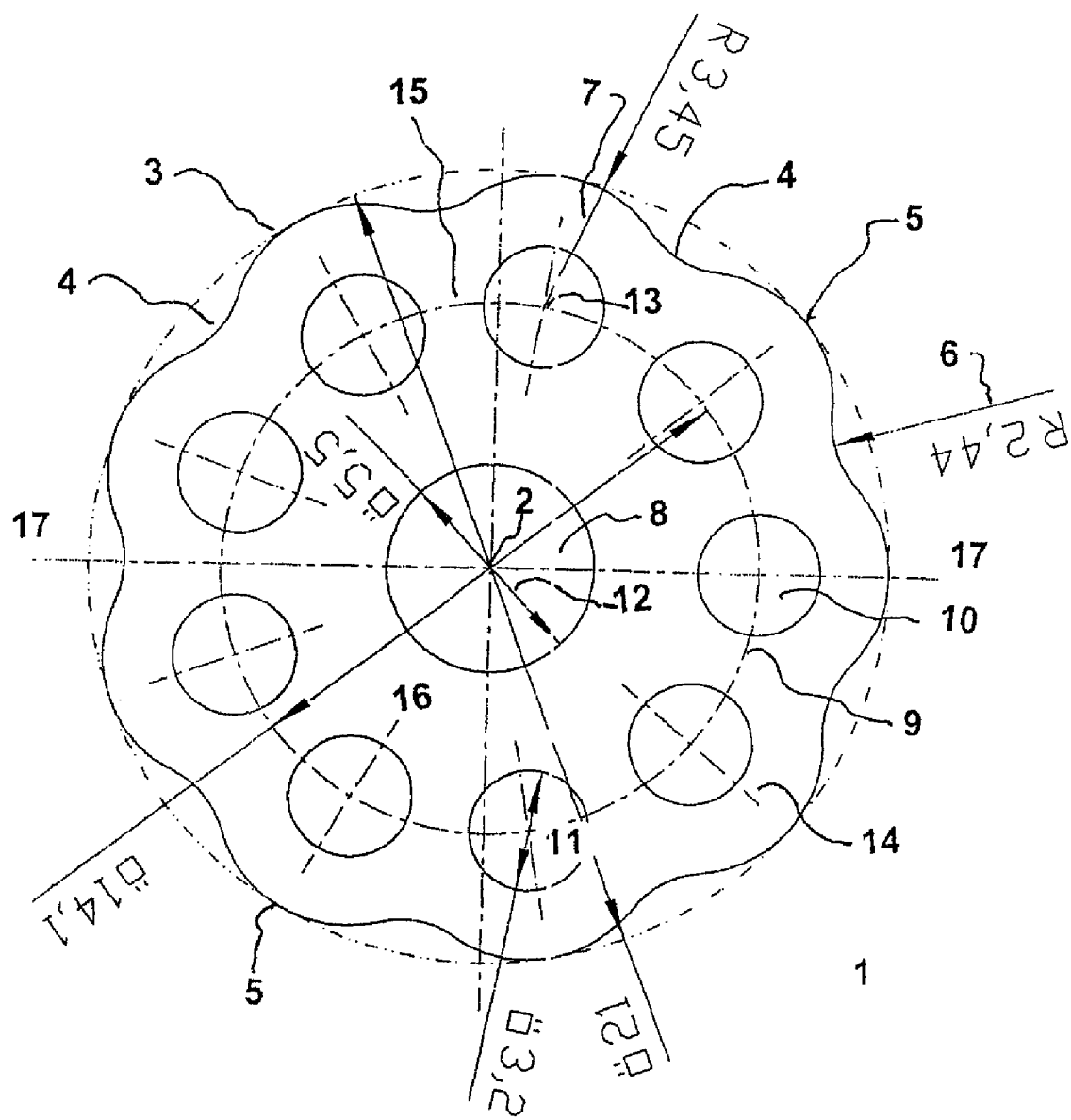

The invention relates to a catalyst support, such as may be used, for example, for the steam reforming of hydrocarbons.

So that as high a conversion rate as possible and as high an output as possible are obtained during heterogeneously catalysed reactions in the gas phase, as large a contact surface as possible should be provided between the gas phase and the catalyst surface, so that an intensive exchange between the catalyst and the gaseous reaction components becomes possible. Thus, for heterogeneously catalysed reactions, reactors have been developed in which the catalyst is provided as a loose heap of small catalyst bodies. The heap must in this case be designed in such a way that, on the one hand, a large surface is provided as a contact surface between a solid catalyst and gaseous reactants, but, on the other hand, the pressure drop across the reactor also does not become too great. Otherwise, the gas throughput through the reactor drops or a high compression of the reaction gas is required. The catalyst introduced into the reactor is to be in as high a fraction as possible for the catalysed reaction. The heap of catalyst should therefore not have too high a density, since, otherwise, the catalyst fraction which is arranged in further-inward portions of the catalyst body and is therefore not available for a catalysis of the reaction rises too sharply. The catalyst body should therefore have as high a ratio as possible of the surface of the catalyst body to its weight. Finally, the catalyst bodies must have sufficiently high mechanical stability, so that they do not disintegrate under mechanical load and collapse into a finely particulate powder or granulate which blocks the flow paths within the catalyst packing and leads to an increase in the pressure drop. Finally, the catalyst bodies must also be shaped such that, when introduced into the reactor, they form the desired heap, that is to say the catalyst bodies should not, for example, be tilted on edge, so as not to form within the reactor any larger cavities which are not filled with catalyst.

In addition to simple spheres or granulates, therefore, a whole series of catalyst bodies have been developed, which provide a uniform heap and as large a surface as possible. Although there is already a high diversity of forms for catalyst bodies, there is still always room for further developments.

Reactors filled with catalysts or catalyst bodies are usually operated continuously for a lengthy period of time of several months to several years, so that slight increases in value in output during the production of the desired compounds already have major economic effects on the viability of the plant.

Likewise, an albeit slight increase in the stability of the catalyst moulded bodies usually means a significant economic benefit, since the operating time of the plant can be prolonged and few interruptions in the production process for renewing the catalyst packing are required.

DE 39 35 073 describes a method for the catalytic dehydration of hydrocarbons, in particular of aromatic alkyls, at increased temperature in the presence of steam and metal-oxide catalyst moulded bodies. The moulded bodies have a gearwheel-like configuration with at least three teeth, the following dimension ratios applying:

(a) the ratio tip diameter ($d_2$): root diameter ($d_1$) is about 1.2 to 2.5:1;

(b) the ratio space width at the tooth root ($b_1$): tooth width ($b_2$) at the tooth crown is 0.1 to 0.9:1;

(c) the space width at the tooth root ($b_1$) is at least 0.1 mm.

DE 39 34 032 A1 describes a heat-transmission or filling-body element, with a core region which extends in the longitudinal direction and on which are arranged projections running in the longitudinal direction and having a T-shaped cross section.

DE 31 41 942 A1 describes catalyst moulded bodies with an essentially cylindrical configuration, having a plurality of longitudinal depressions which extend radially inwards from the cylinder circumference and delimit elevations which lie between them and the maximum width of which is greater than that of the depressions.

DE 31 18 835 A1 describes a catalyst structure for the partial oxidation of n-butane for the production of maleic acid anhydride. The catalysts are in the form of a tablet, in the centre of which a hole or a cavity is arranged.

DE 29 14 079 describes heaped exchange bodies with reactive material, which are suitable, in particular, for the enrichment of trace substances from large water masses. The heaped bodies have a mechanically stable outer contour and a liquid-accessible reactive surface protected from mechanical attack by adjacent bodies.

DE 27 19 543 A describes ceramic bodies for receiving a catalyst, in particular for the forming of hydrocarbons. The ceramic body is in the form of a tube, in the inner cavity of which are arranged webs running radially outwards from the longitudinal axis.

DE 24 25 058 describes filling bodies consisting of ceramic material which are in the form of tubular segments. The tubular segments have a plurality of longitudinal ducts running parallel to one another. In this case, a plurality of longitudinal ducts may be arranged around a central longitudinal duct.

The object on which the invention is based was, therefore, to provide a catalyst body which makes it possible to produce as homogeneous a catalyst heap as possible, while as large a surface of the catalyst body as possible is to be provided.

This object is achieved by means of a catalyst body having the features of Patent Claim 1. Advantageous developments are the subject-matter of the dependent claims.

According to the invention, a cylindrical catalyst body is provided, which on its circumferential surface has grooves running parallel to the longitudinal axis of the catalyst body and webs running between the grooves. The catalyst body is characterized in that the grooves and the webs running between the grooves are in their cross section in the form of a segment of a circle.

The grooves and webs provided on the circumferential surface of the catalyst body enlarge the surface of the catalyst body, so that, with the quantity of active mass being the same, a larger contact surface between the catalyst and the gaseous reaction partners is also provided, as compared with a straightforward cylindrical shape. As a result, with the catalyst quantity being constant, a higher throughput of the reaction partners through the reactor can be brought about, and, as a result, also an increase in the output per unit time. The grooves are in their cross section in the form of a segment of a circle. What is considered in this context to be a cross section is a section perpendicular to the longitudinal axis of the catalyst body. Owing to the arcuate configuration of the grooves, stress notches are avoided, which may lead to a fracture of the catalyst body. Webs, the cross section of which is in the form of a segment of a circle, run between the grooves. Owing to the arcuate configuration of the cross section of the web surface, edges are avoided, which, for example, may break when the catalyst bodies are being introduced into the reactor. In the catalyst body according to the invention, the selected radius of the segment of a circle of the webs is different from the radius of the segment of a circle of the grooves. The catalyst bodies therefore cannot come together in such a way that a web of one catalyst body comes to bear in the groove of another catalyst body, in which case the corresponding surfaces of web and groove bear one against the other in a planar manner and cause a reduction in the available catalyst surface. If the radius of the cross section of the webs is smaller than the radius of the grooves, the webs may admittedly come to bear in the grooves, but the surfaces of groove and web do not lie, planar, one on the other. In the preferred embodiment, the radius of the segment of a circle of the webs is larger than the radius of the segment of a circle of the grooves. Thus, the webs cannot penetrate into the grooves and come to bear there. The selected radius of the segments of a circle of the grooves is preferably between 1 and 5 mm, in particular preferably between 2 and 3 mm. The radius of the segments of a circle of the webs is preferably between 2 and 5 mm, in particular preferably between 3 and 4 mm.

Preferably, the catalyst body has a central duct which extends along the longitudinal axis of the catalyst body. Thus, the surface of the catalyst body can be further enlarged and the density or weight of the catalyst body further lowered, without any appreciable loss of stability of the catalyst body having to be accepted.

The central duct preferably has a circular cross section.

According to a preferred embodiment, the catalyst body has secondary ducts which run parallel to the longitudinal axis, but eccentrically with respect to this. By means of the secondary ducts, a further enlargement of the surface of the catalyst body is achieved, and the quantity of active material required for producing the catalyst body is further reduced.

The secondary ducts preferably have a circular cross section.

The selected number of secondary ducts is preferably greater than 7, in particular preferably greater than 8, and is particularly preferably equal to 9. The selected number of secondary ducts is preferably as high as possible, so that the surface of the catalyst body can be configured as large as possible and in order to keep as low as possible the pressure drop caused by the catalyst body. On the other hand, a compromise must be found in terms of the stability of the catalyst body. The webs between the secondary ducts or between the central duct and the secondary ducts must still be sufficiently wide to ensure that the load caused by the heap on the individual catalyst support can still be absorbed.

The longitudinal axes of the secondary ducts are preferably arranged on a circle or a surface of cylinder, the centre point or axis of which is formed by the longitudinal axis of the catalyst body. The catalyst support thereby acquires an essentially rotationally symmetrical configuration, with the result that a higher degree of freedom in the arrangement of the catalyst body in the packing of the reactor is achieved, that is to say the homogeneity of the packing of the catalyst body is increased, thereby achieving a uniform gas flow through the reactor packing. The diameter of the circle on which the centre points or longitudinal axes of the secondary ducts are arranged is preferably between 10 and 20 mm, preferably between 12 and 16 mm.

The centre point of the segment of a circle of the webs is preferably arranged on the longitudinal axis of the corresponding secondary duct. As a result, the web, which delimits the secondary ducts relative to the outside of the catalyst body, acquires a uniform thickness, and the forces acting on the outside of the catalyst body can be introduced, due to the arcuate shape of the web, into the catalyst body, with the result that the stability of the latter is increased. The arcuate shape of the web can be seen in a view of the end face of the catalyst body.

The secondary ducts arranged in the catalyst body preferably have a smaller diameter than the central duct. The selected diameter of the central duct may be relatively large, in order thereby to enlarge the surface of the catalyst body and to reduce the pressure drop caused by the individual catalyst body. The diameter of the central duct is in this case selected such that the webs arranged between the central duct and secondary ducts have a sufficient thickness to ensure the required stability of the catalyst body.

The selected diameter of the central duct is preferably between 4 and 8 mm. The selected diameter of the secondary ducts is preferably between 1.5 and 3 mm. The selected thickness of the webs, which delimit the secondary ducts relative to the outside of the catalyst body or are arranged between the secondary ducts or between the secondary ducts and the central duct, is preferably greater than 1 mm, preferably greater than 1.5 mm, and particularly preferably between 1.6 and 4 mm.

In order to achieve as uniform a heaping of the catalyst bodies as possible in the reactor, the catalyst body according to the invention is preferably configured such that its extent in the direction of the longitudinal axis corresponds approximately to the diameter of the catalyst body perpendicularly to the longitudinal axis. Preferably, the selected ratio of the diameter of the catalyst body to its longitudinal extent is between 0.9 and 1.5. The selected diameter of the catalyst body is preferably between 15 mm and 30 mm, preferably between 18 and 25 mm, and is particularly preferably about 21 mm. The extent of the catalyst body in the direction of the longitudinal axis is preferably between 15 mm and 30 mm, preferably between 18 mm and 25 mm, and is particularly preferably about 16 mm.

In order to achieve as long a useful life as possible for the heaping of the catalyst bodies, the catalyst bodies must have sufficiently high strength. This may be achieved, on the one hand, by the geometric construction of the catalyst body and, on the other hand, by the strength of the material from which the catalyst body is produced. Preferably, the catalyst body has a lateral pressure resistance of more then 700 N. The lateral pressure resistance can be measured by determining the force which is at least required in order to bring about a bursting of the catalyst body when the latter is tension-mounted between two planar jaws, the planar surfaces of the jaws being arranged parallel to the longitudinal axis of the catalyst body.

The catalyst body is particularly suitable for use in the steam reforming of hydrocarbons. In a version as a catalyst for the steam reforming of hydrocarbons, the catalyst body is preferably constructed essentially from, in each case calculated as a metal oxide:

| | |
|---|---|
| NiO | 10-20% by weight |
| CaO | 10-20% by weight |
| $Al_2O_3$ | up to 100% by weight. |

The catalyst body may contain slight quantities of impurities. The fraction of Na and of $SiO_2$ in the catalyst body is preferably less than 0.05% by weight.

The catalyst body according to the invention can be produced by means of conventional methods, for example by extrusion. The constituents of the catalyst body are in this case ground into a fine powder which preferably has an average grain size $D_{50}$ of 5 to 300 μm, if appropriate mixed with a lubricant, such as graphite or a long-chain fatty acid, and then, if appropriate after being mixed with water, converted into the desired form.

A further subject of the invention is the use of the above-described catalyst body for the steam reforming of hydrocarbons.

The invention is explained in more detail further below, with reference to an accompanying figure in which:

FIG. 1 shows a cross section through an embodiment of the catalyst body according to the invention.

FIG. 1 shows a cross section through the catalyst body 1 according to the invention perpendicularly to the longitudinal axis 2 of the catalyst body 1 or to the end face of the catalyst body according to the invention. The outer circumferential surface 3 of the catalyst body 1 is composed of a sequence of grooves 4 and webs 5. The grooves 4 and webs 5 form in each case segments of a circle in a view of the cross section, the selected radius 6 of the segments of a circle of the grooves 4 being smaller than the radius 7 of the segments of a circle of the webs 5. In the case of catalyst bodies arranged next to one another, therefore, the webs 5 of the one catalyst body 1 cannot bear in a planar manner against the surface of the grooves 4 of the other catalyst body. Along the longitudinal axis 2 of the catalyst body 1 runs a central duct 8. Nine secondary ducts 10 are arranged at regular intervals around the central duct 8 on a circle 9, the centre point of which coincides with the longitudinal axis 2 of the catalyst body 1, and run parallel to the central duct 8. The diameter 11 of the secondary ducts 10 is smaller than the diameter 12 of the central duct 8. The longitudinal axis 13 of the secondary ducts 10 in this case coincides with the longitudinal axis or the centre point of the segments of a circle of the assigned webs 5, so that the secondary ducts are delimited relative to the outside of the catalyst body 1 by an arcuate web 14 which has an essentially constant thickness. The thickness of the webs 15 arranged between two secondary ducts 10 in this case corresponds approximately to the thickness of the arcuate webs 14. In the embodiment shown, the selected thickness of the webs 16 which are arranged between the central duct 8 and secondary ducts 10 is greater than the thickness of the webs 15 which are arranged between two secondary ducts 10. The diameter 17 of the catalyst body 1 corresponds approximately to the longitudinal extent of the catalyst body in the direction of the longitudinal axis 2.

LIST OF REFERENCE SYMBOLS

1 Catalyst body
2 Longitudinal axis
3 Circumferential surface
4 Groove
5 Web
6 Radius
7 Radius
8 Central duct
9 Circle
10 Secondary duct
11 Diameter
12 Diameter
13 Longitudinal axis
14 Web
15 Web
16 Web
17 Diameter

The invention claimed is:

1. A cylindrical catalyst body, comprising a circumferential surface having grooves running parallel to the longitudinal axis of the catalyst body and webs running between the grooves, characterized in that the grooves and the webs running between the grooves are in their cross section in the form of a segment of a circle, wherein the selected radius of the segment of the circle of the webs is larger than the radius of the segment of the circle of the grooves wherein the catalyst body further comprises a central duct which extends along the longitudinal axis of the catalyst body, and wherein the catalyst body further comprises secondary ducts which run parallel to the longitudinal axis of the catalyst body, but eccentrically with respect thereto and wherein the longitudinal axes of the secondary ducts are arranged on a circle, the centre point of which is formed by the longitudinal axis of the catalyst body, and the centre point of the segment of a circle of the webs are arranged on the longitudinal axis of the secondary duct.

2. Catalyst body according to claim 1, characterized in that the central duct has a circular cross section.

3. Catalyst body according to claim 1, characterized in that the secondary ducts have a circular cross section.

4. Catalyst body according to claim 1, characterized in that the number of secondary ducts is greater than 7.

5. Catalyst body according to claim 1, characterized in that the secondary ducts have a smaller diameter than the central duct.

6. Catalyst body according to claim 1, characterized in that the selected diameter of the central duct is between 4 and 8 mm.

7. Catalyst body according to claim 1, characterized in that the selected diameter of the secondary ducts is 8. Catalyst body according to claim 1, characterized in that the selected ratio of the diameter of the catalyst body to its longitudinal extent is between 0.9 and 1.5.

9. Catalyst body according to claim 1, characterized in that the catalyst body has a lateral pressure resistance of more than 700 N.

10. Catalyst body according to claim 1, characterized in that the catalyst body comprises the following composition, wherein the composition in each case is calculated as a metal oxide:

| | |
|---|---|
| NiO | 10-20% by weight |
| CaO | 10-20% by weight |
| $Al_2O_3$ | up to 100% by weight. |

11. Catalyst body according to claim 1, characterized in that the fraction of Na and of $SiO_2$ in the catalyst body is less than 0.05% by weight.

12. Steam reforming of hydrocarbons comprising passing a feed stream over the cylindrical catalyst body of claim 1.

* * * * *